(12) United States Patent
Zheng et al.

(10) Patent No.: US 12,732,445 B2
(45) Date of Patent: Sep. 8, 2026

(54) LOCALIZATION OF NETWORK FAILURES

(71) Applicant: Microsoft Technology Licensing, LLC, Redmond, WA (US)

(72) Inventors: Yang Zheng, Kirkland, WA (US); Denizcan Billor, Seattle, WA (US); Tristan Naoki Struthers, Seattle, WA (US); Jamie D. Gaudette, Kirkland, WA (US); Surinder Hari, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

(21) Appl. No.: 18/569,920

(22) PCT Filed: Jun. 13, 2022

(86) PCT No.: PCT/US2022/072907
§ 371 (c)(1),
(2) Date: Dec. 13, 2023

(87) PCT Pub. No.: WO2022/266606
PCT Pub. Date: Dec. 22, 2022

(65) Prior Publication Data

US 2024/0275703 A1 Aug. 15, 2024

(30) Foreign Application Priority Data

Jun. 16, 2021 (LU) ........................................ 500281

(51) Int. Cl.
*H04L 43/0829* (2022.01)
*H04L 41/0631* (2022.01)

(52) U.S. Cl.
CPC ...... *H04L 43/0841* (2013.01); *H04L 41/0631* (2013.01)

(58) Field of Classification Search
CPC .. H04L 43/0841; H04L 41/0631; H04L 43/10
See application file for complete search history.

(56) References Cited

U.S. PATENT DOCUMENTS 9,712,381 B1 7/2017 Emanuel et al.
2018/0337839 A1 11/2018 Bristow
(Continued)

OTHER PUBLICATIONS

Communication pursuant to Article 94(3) received in European Application No. 22735281.2, mailed on Mar. 7, 2025, 5 pages.
(Continued)

*Primary Examiner* — Diane D Mizrahi
(74) *Attorney, Agent, or Firm* — Workman Nydegger

(57) ABSTRACT

A method, implemented at a computer system in a network, for localizing network failure in the network includes enumerating at least one path between the computer system and a path destination node in the network through one or more intermediary nodes. The method further includes enumerating a plurality of sub-paths between the computer system and the path destination node. Each sub-path has either the path destination node, or one or more intermediary nodes of the corresponding path as a corresponding sub-path destination node. For each of the plurality of sub-paths, determining a probability that a data packet can successfully traverse the round trip of the corresponding sub-path and identifying a node in the network where network failure have occurred.

20 Claims, 14 Drawing Sheets

510

| Sub-Path | Total number of packets sent from Source Node S | Number of packets successfully returned to Source Node S | Success Rate / Probability | Probability Notation |
|---|---|---|---|---|
| A | 160 | 160 | 1 | P(A) |
| AB | 161 | 161 | 1 | P(AB) |
| ABC | 160 | 160 | 1 | P(ABC) |
| ABCD | 160 | 160 | 1 | P(ABCD) |
| ABCDE | 100 | 68 | 0.68 | P(ABCDE) |
| ABCDEF | 50 | 34 | 0.68 | P(ABCDEF) |
| ABCDEFG | 49 | 33 | 0.673469 | P(ABCDEFG) |

511, 512, 513, 514, 515, 516, 517

520

| P(A) | 1 |
|---|---|
| P(B\|A) | 1 |
| P(C\|AB) | 1 |
| P(D\|ABC) | 1 |
| P(E\|ABCD) | 0.68 |
| P(F\|ABCDE) | 1 |
| P(G\|ABCDEF) | 0.990396 |
| ... | ... |

(56) References Cited

U.S. PATENT DOCUMENTS

| | | | | |
|---|---|---|---|---|
| 2019/0149449 | A1* | 5/2019 | Morris | H04L 49/901<br>709/245 |
| 2022/0272035 | A1* | 8/2022 | Bastug | H04L 45/70 |

OTHER PUBLICATIONS

"Conditional probability", accessed on link https://en.wikipedia.org/wiki/Conditional_probability, retrieved on Jul. 12, 2024, 11 pages.

International Search Report and Written Opinion received for PCT Application No. PCT/US22/072907 Sep. 21, 2022, 12 pages.

Search Report and Written Opinion Issued in Luxembourg Application No. LU500281, mailed on Mar. 11, 2022, 10 pages.

First Office Action Received for Chinese Application No. 202280042684.4, mailed on Jul. 13, 2026, 19 pages. (English translation Provided).

* cited by examiner

510

| Sub-Path | Total number of packets sent from Source Node S | Number of packets successfully returned to Source Node S | Success Rate / Probability | Probability Notation |
|---|---|---|---|---|
| A | 160 | 160 | 1 | P(A) |
| AB | 161 | 161 | 1 | P(AB) |
| ABC | 160 | 160 | 1 | P(ABC) |
| ABCD | 160 | 160 | 1 | P(ABCD) |
| ABCDE | 100 | 68 | 0.68 | P(ABCDE) |
| ABCDEF | 50 | 34 | 0.68 | P(ABCDEF) |
| ABCDEFG | 49 | 33 | 0.673469 | P(ABCDEFG) |

511 512 513 514 515 516 517

520

| | |
|---|---|
| P(A) | 1 |
| P(B\|A) | 1 |
| P(C\|AB) | 1 |
| P(D\|ABC) | 1 |
| P(E\|ABCD) | 0.68 |
| P(F\|ABCDE) | 1 |
| P(G\|ABCDEF) | 0.990396 |
| ... | ... |

*Fig. 5*

LOCALIZATION OF NETWORK FAILURES

CROSS-REFERENCE TO RELATED APPLICATIONS

The present application is a U.S. National Stage of International Application No. PCT/US2022/072907, filed on 13 Jun. 2022, designating the United States and claiming the priority of Luxembourg Patent Application No. LU500281 filed with the Luxembourg Intellectual Property Office on 16 Jun. 2021. All of the aforementioned applications are incorporated herein in their respective entirety by this reference.

TECHNICAL FIELD

The present disclosure relates to systems, methods, and devices that are capable of localizing network failures and/or identifying network nodes that have failed.

BACKGROUND

A computer network is a group of computers and/or communication devices that use a set of common communication protocols over digital interconnections. Each of the computers and/or communication devices in the computer network is called a network node. The nodes of a computer network may include personal computers, servers, networking hardware (e.g., routers, switches), and/or other specialized or general-purpose hosts. The nodes are identified by network addresses and/or hostnames. Hostnames serve as memorable labels for the nodes. Network addresses serve for locating and identifying the nodes by communication protocols such as the Internet Protocol (IP). Communication data is divided into packets, and the packets are sent from a source node to a destination node. Such a computer network may be used to exchange messages and/or share resources located on or provided by one of the network nodes. From time to time, network failures may occur at some nodes, which may worsen the overall performance of the network.

BRIEF SUMMARY

The embodiments herein are directed to a method and/or a computer system for localizing network failure in a network. The network includes a plurality of nodes. A topology of the network indicates how the plurality of nodes are connected to each other. The computer system is one of the plurality of nodes in the network. First, the computer system enumerates at least one path between the computer system and a path destination node in the network through one or more intermediary nodes in the network. The computer system further enumerates a plurality of sub-paths between the computer system and the path destination node. Each sub-path has either the path destination node, or one or more of the intermediary nodes of the corresponding path as a corresponding sub-path destination node.

For each of the plurality of sub-paths, the computer system generates a first number of sub-path data packets. Each of the plurality of sub-path data packets is configured to traverse a round trip of a sub-path from the computer system to the corresponding sub-path destination node, and then from the corresponding sub-path destination node back to the computer system. The first number of sub-path data packets are then sent over the network. Thereafter, a second number of at least a portion of the sub-path data packets are received by the computer system. Receiving the second number of at least a portion of the sub-path data packets, the computer system determines a probability that a data packet will successfully traverse the round trip of the sub-path by dividing the second number by the first number. As such, a plurality of probabilities for the plurality of sub-paths are determined. Based on the plurality of probabilities, an intermediary node or the path destination node is identified as where network failure occurs.

In some embodiments, the method includes determining an Nth probability corresponding to a probability that a data packet can successfully traverse an Nth sub-path of the at least one path. The Nth sub-path includes a first node through an Nth node along the at least one path, where N is a natural number. The method also includes determining an (N+1)th probability corresponding to a probability that a data packet can successfully traverse an (N+1)th sub-path of the at least one path. The (N+1)th sub-path includes the first node through an (N+1)th node along the at least one path. The method further includes determining an (N+1)th conditional probability that a data packet can pass through the (N+1)th node after the data packet can pass through the Nth node by dividing the (N+1)th probability by the Nth probability. It is then determined whether the (N+1)th conditional probability is greater than the threshold. In response to determining that the (N+1)th condition probability is no greater than the threshold, it is determined that failures have occurred at the (N+1)th node.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of the subject matter briefly described above will be rendered by reference to specific embodiments, which are illustrated in the appended drawings. Understanding that these drawings depict only typical embodiments and are not, therefore, to be considered to be limiting in scope, embodiments will be described and explained with additional specificity and details through the use of the accompanying drawings in which:

FIG. 5 illustrates a set of tables, including an example set of data generated based on the principles described herein;

DETAILED DESCRIPTION

The embodiments herein are directed to a method and/or a computer system for localizing network failure in a network. The network includes a plurality of nodes. A topology of the network indicates how the plurality of nodes are connected to each other. The computer system is one of the plurality of nodes in the network. First, the computer system enumerates at least one path between the computer system and a path destination node in the network through one or more intermediary nodes in the network. The computer system further enumerates a plurality of sub-paths between the computer system and the path destination node. Each sub-path has either the path destination node, or one or more of the intermediary nodes as a corresponding sub-path destination node.

For each of the plurality of sub-paths, the computer system generates a first number of sub-path data packets. Each of the plurality of sub-paths is configured to traverse a round trip of a sub-path from the computer system to the corresponding sub-path destination node, and then from the corresponding sub-path destination node back to the computer system. The first number of sub-path data packets are then sent over the network. Thereafter, a second number of at least a portion of the sub-path data packets are received by the computer system. Receiving the second number of at least a portion of the sub-path data packets, the computer system determines a probability that a data packet will successfully traverse the round trip of the sub-path by dividing the second number by the first number. As such, a plurality of probabilities for the plurality of sub-paths are determined. Based on the plurality of probabilities, an intermediary node or the path destination node is identified as where network failure occurs.

Note, in some embodiments, each sub-path data packet includes a time-to-live (TTL) value. The TTL value may be a time (e.g., 1 minute) or a number of hops. When the TTL value is reached, and the packet has not been delivered to the destination, the packet is discarded and a TTL expiration message is sent back to a source address of the packet. In some embodiments, the TTL value can be set as a particular value, and the source address of each sub-path data packet (and the packets encapsulated therein) may have an address of the computer system. When the TTL value is reached, and the packet has not been delivered, a TTL expiration message is sent back to the computer system, and the computer system would know that the return packet will not be received. In some embodiments, the TTL value can be set sufficiently large, such that the expiration of TTL can be ignored. When a return packet is not received for a predetermined time (e.g., 1 second, 5 second, or 1 minute), the system determines that the packet is not returned.

Figure 1:
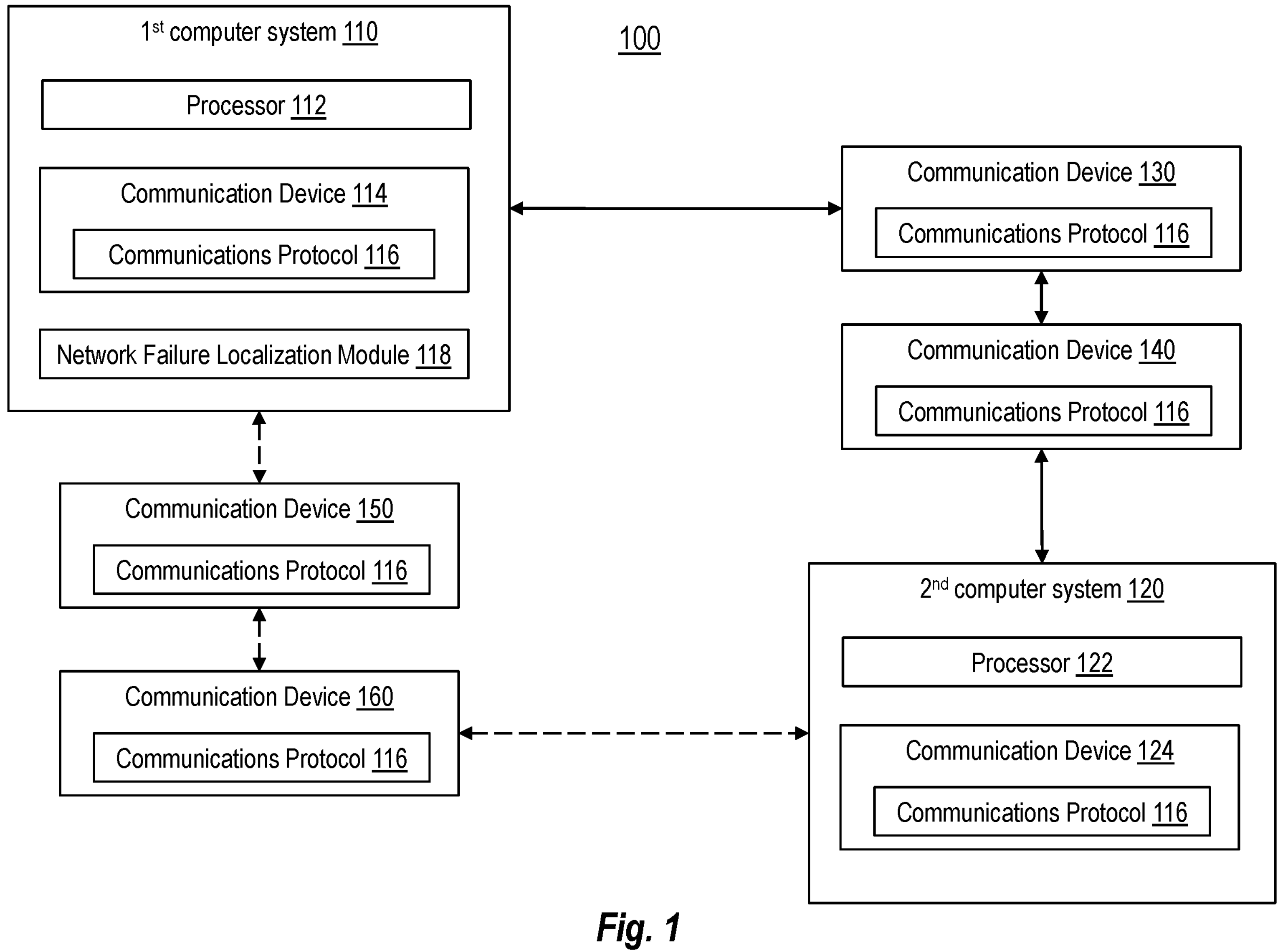
FIG. 1 illustrates an example of a simplified computer network in which the principles described in is implemented.

To accomplish the foregoing, FIG. 1 illustrates an example of a simplified computer network 100 (also referred to as a network), including a first computer system 110, a second computer system 120, and communication devices 130, 140, 150, and 160. In embodiments, each of the communication devices 130-160 is also referred to as a node of the computer network 100. A node is any type of device that is capable of communicating with each other, such as (but not limited to) a different computer system, a router, a switch, and/or a special or general-purpose relay device.

The first computer system 110 includes a processor 112 and a communication device 114. The communication device 114 is configured to communicate with the other nodes over the computer network 100 via one or more communication protocols 116. The first computer system 110 also includes a network failure localization module 118 configured to localize network failures. In some embodiments, the network failure localization module 118 is a hardware and/or software component, including one or more computer-readable hardware storage devices stored thereon computer-readable instructions. The computer-readable instructions are structured such that, when executed by the one or more processors 112, the computer-executable instructions configure the first computer system to localize network failures.

The second computer system 120 also includes a processor 122 and a communication device 124, which is configured to communicate with the other nodes over the computer network 100 via the one or more communication protocols 116. Notably, the second computer system 120 may or may not include a network failure localization module.

In some embodiments, each of the communication devices 130-140 is a general-purpose computer system. However, in other embodiments, each, or some, of the communication devices 130-140 is a special-purpose device, such as (but not limited to) a router, a switch, a relay device, etc. At a minimum, each of the communication devices 130-140 is capable of communicating with the rest of the nodes in the computer network 100 via the one or more communication protocols 116.

The first computer system 110 and the second computer system 120 are configured to communicate with each other via different paths over the computer network 100. For example, the first computer system 110 can reach the second computer system 120 via a first path (marked by solid line arrows) including communication devices 130-140, or via a second path (marked by dotted line arrows) including communication devices 150-160. For example, depending on circumstances (e.g., the traffic among different paths, the status of the different nodes in the computer network 100, etc.), when the first computer system 110 sends a packet directed to the second computer system 120, the packet may be routed to the communication device 130 or 150. Assuming the packet happens to be routed to the communication device 130, the communication device 130 is configured to forward the packet to the communication device 140. Based at least on receiving the packet, the communication device 140 then delivers the packet to the second computer system 120.

Figure 2:
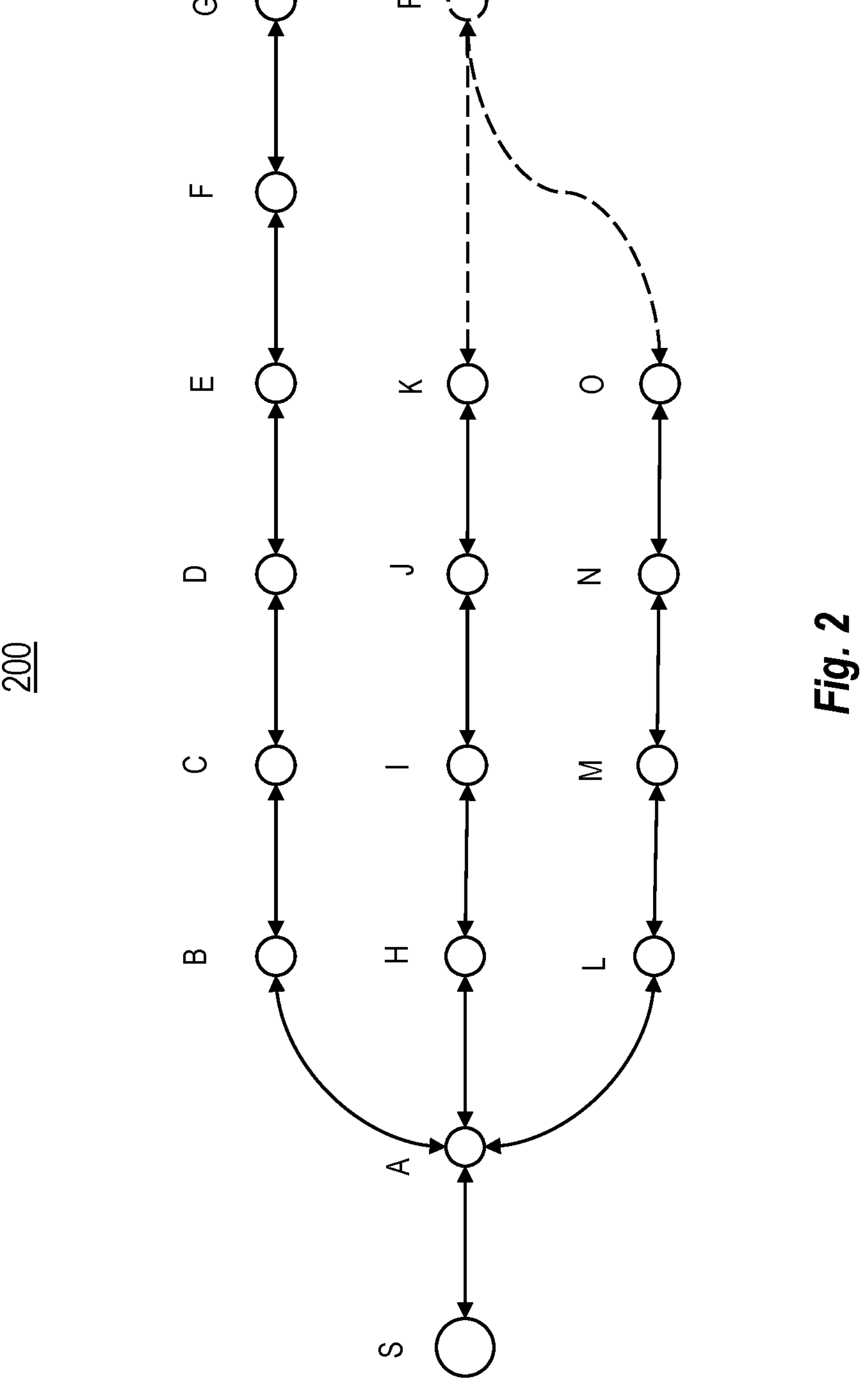
FIG. 2 illustrates an example of a network including a computer system S and a number of nodes A-P in which the principles described herein is implemented at the computer system S.

Notably, the network 100 only includes five nodes. To identify whether one of the five nodes has failed, one could perform a testing at each of the five nodes to determine whether the corresponding node works properly. However, in real world, a network may have a much larger number of nodes. For example, FIG. 2 illustrates another example of a network 200, including a computer system S (also referred to as a source node) and a number of nodes A-P. When failure occurs at one of the nodes A-P, the communications among the rest of the nodes may still be performed via different paths in the network. To identify which node has failed, one could test each of the nodes A-P to determine whether each one of the nodes A-P has failed. However, this approach would be burdensome.

The principles described herein disclose a method for systematically localizing failures in a network by sending probing packets. The method includes enumerating at least one path between a source computing system and a destination node. Referring back to FIG. 2, for example, the at least one path may include (1) a path between the source node S and node G, (2) a path between the source node S and node P (through node H), and/or (3) a path between the source node S and the node P (through node L). For each of the at least one path, a plurality of sub-paths between the source node and the path destination node are also enumerated. Each sub-path has either the path destination node, or one or more of intermediary nodes of the path as a corresponding sub-path destination node.

When the at least one path includes the path between the source node S and node G, a plurality of sub-paths include (1) a first sub-path between the source node S and node A, (2) a second sub-path between the source Node S and node B, (3) a third sub-path between the source node S and node C, (4) a fourth sub-path between the source node S and node D, and (5) a fifth sub-path between the source node S and node G. For each of the sub-paths, a first number of sub-path data packets are generated. Each of the sub-path data packets is configured to traverse a round trip of the corresponding sub-path from the computer system to the corresponding sub-path destination node, and then from the corresponding sub-path destination node back to the computer system.

Note, in some embodiments, each sub-path data packet includes a time-to-live (TTL) value. The TTL value may be a time (e.g., 1 minute) or a number of hops. When the TTL value is reached, and the packet has not been delivered to the destination, the packet is discarded and a TTL expiration message is sent back to a source address of the packet. In some embodiments, the TTL value can be set as a particular value, and the source address of each sub-path data packet (and the packets encapsulated therein) may have an address of the computer system. When the TTL value is reached, and the packet has not been delivered, a TTL expiration message is sent back to the computer system, and the computer system would know that the return packet will not be received. In some embodiments, the TTL value can be set sufficiently large, such that the expiration of TTL can be ignored. In such a case, a predetermined time (e.g., 1 second, 5 second, or 1 minute) is set. When a return packet is not received for the predetermined time, the system determines that the packet is not returned.

Figure 3A:
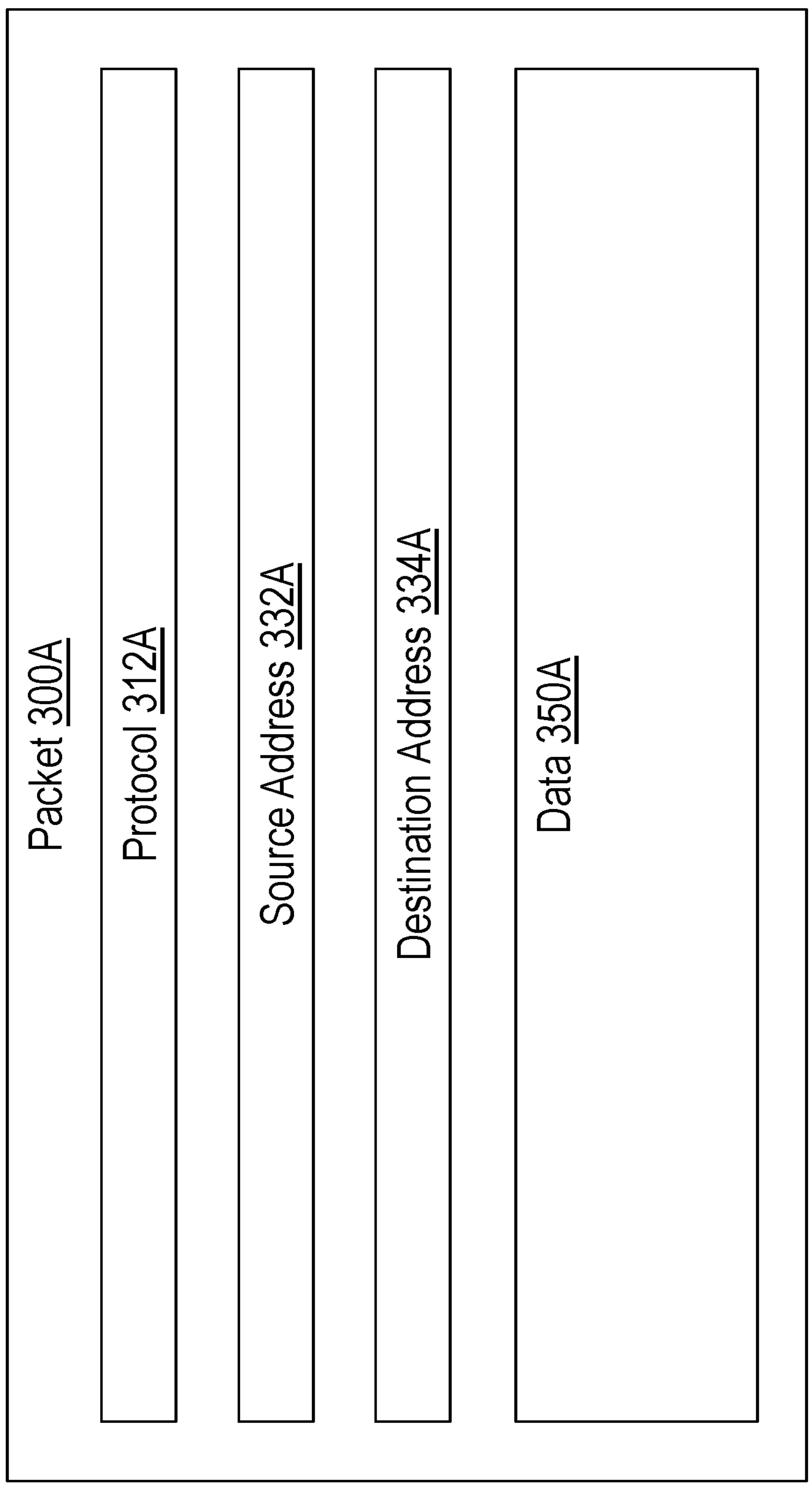
FIG. 3A illustrates an example of a data packet including a source address field and a destination address field.

Based on the communications protocol(s) used, (e.g., Internet Protocol (IP)), each sub-path packet includes many different fields, including (but not limited to) a source address field, and a destination address field. FIG. 3A illustrates an example of a data packet 300A, including a source address field 332A, a destination address field 334A, and a data field 350A. In some embodiments, there is also a protocol field 312A configured to store a value indicating a protocol type of data stored in the data field 350A. For example, in an IP data packet, the protocol field 312A can store a value of 17 for User Datagram Protocol (UDP) data, or a value of 6 for Transmission Control Protocol (TCP) data, etc.; and each of the source address field 332A and the destination address field 334A stores an IP address of a source computer system or a destination computer system. Using such a protocol, a network allows a source computer system to send a data packet from a node having a source address to a node having a destination address.

Figure 3B:
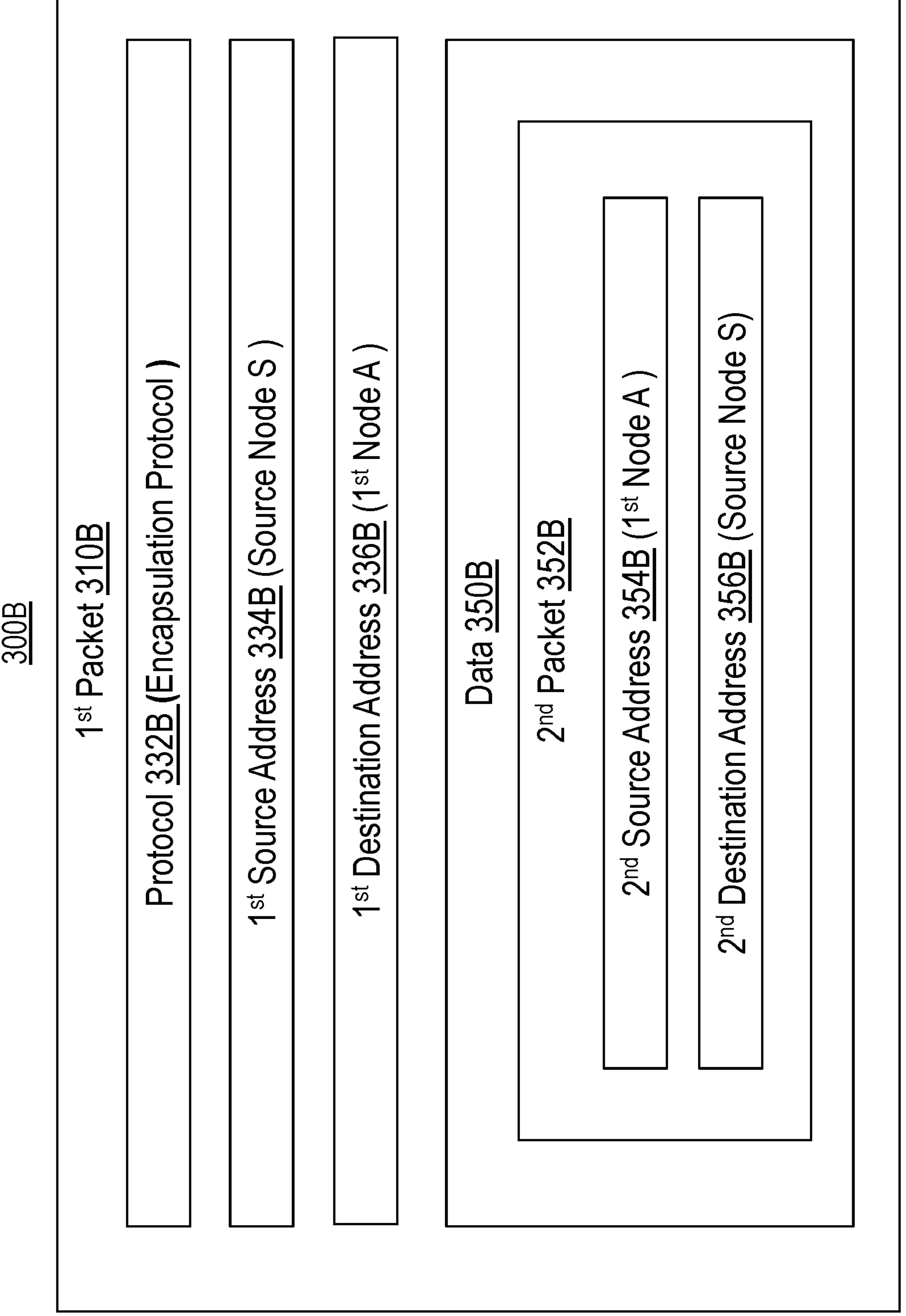
FIG. 3B illustrates an example of an encapsulated data packet, including a first data packet encapsulating a second data packet configured to traverse a round trip of a first sub-path in a path.

However, as described above, the sub-path packet is configured to traverse a round trip of a sub-path. Thus, the data packet 300A alone cannot achieve such a goal. To achieve this goal, in some embodiments, an encapsulated data packet is used. FIG. 3B illustrates an example of an encapsulated data packet 300B. The encapsulated data packet 300B includes a first packet 310B. The first packet 310B includes a protocol field 332B, a first source address field 334B, a destination address field 336B, and a data field 350B. The protocol field 332B stores an encapsulation protocol. The first source address field 334B stores a network address of the source node S (which corresponds to the source node S of FIG. 2). The first destination address field 336B stores a network address of a first node A (which corresponds to the first node A in the path A-G of FIG. 2). The data field 350B encapsulates a second packet 352B. The second packet 352B includes a second source field 354B and a second destination address field 356B. The second source address field 354B stores a network address of the first node A (which corresponds to the first node A in the path A-G of FIG. 2). The second destination address field 356B stores a network address of the source node S (which corresponds to the source node S of FIG. 2).

When the encapsulated data packet 300B is sent by the source node S of FIG. 2 over the network 200, the encapsulated data packet 300B is received by the first node A, because the first destination address field 336B stores the network address of the first node A. Receiving the encapsulated data packet 300B, the first node A decapsulates the data packet 300B to extract the second packet 352B and send the second packet 352B over the network. Since the second destination address field 356B stores the network address of the source node S, once the second data packet is sent over the network 200, the second data packet is sent to the source node S. As such, a round trip of the first sub-path between the source node S and node A is traversed.

Notably, it may be that not every data packet sent over the network 200 will be delivered at the destination address, especially when failures have occurred at one or more nodes along the path. In some embodiments, a predetermined time is set. When a second packet 352B is not received within the predetermined time. It is determined that the second packet 352B counted as not received or returned. As such, in embodiments, a first number of encapsulated data packets (each of which corresponds to the encapsulated data packet 300B) are generated and sent by the source node S over the network. A second number of the second packets (each of which corresponds to the second packet 352B) is received by the source node S within the predetermined time. A probability P(A) that a data packet will successfully go through destination node A is computed by dividing the second number by the first number.

Alternatively, or in addition, in some embodiments, the second source address field 354B is set as the address of the source node S, and particular TTL values are set at each of the first packet 310B and the second packet 352B. When one of the TTL values is reached, and the first packet 310B or the second packet 352B has not been delivered to its destination address, a TTL expiration message is sent to the source node S. Upon receiving the TTL expiration value, the source node S determines that the second packet 352B will not be received or returned.

Next, a round trip of the second sub-path between the source node S and the node B is to be traversed. For traversing the second sub-path between the source node S and the node B, a second sub-path data packet is generated. The second sub-path data packet is configured to traverse a round trip of the second sub-path, including from the source node S to the first node A, then to the second node B, and then from the second node B to the first node A, and finally back to the source node S. To achieve this goal, a more complicated encapsulated data packet needs to be generated.

Figure 3C:
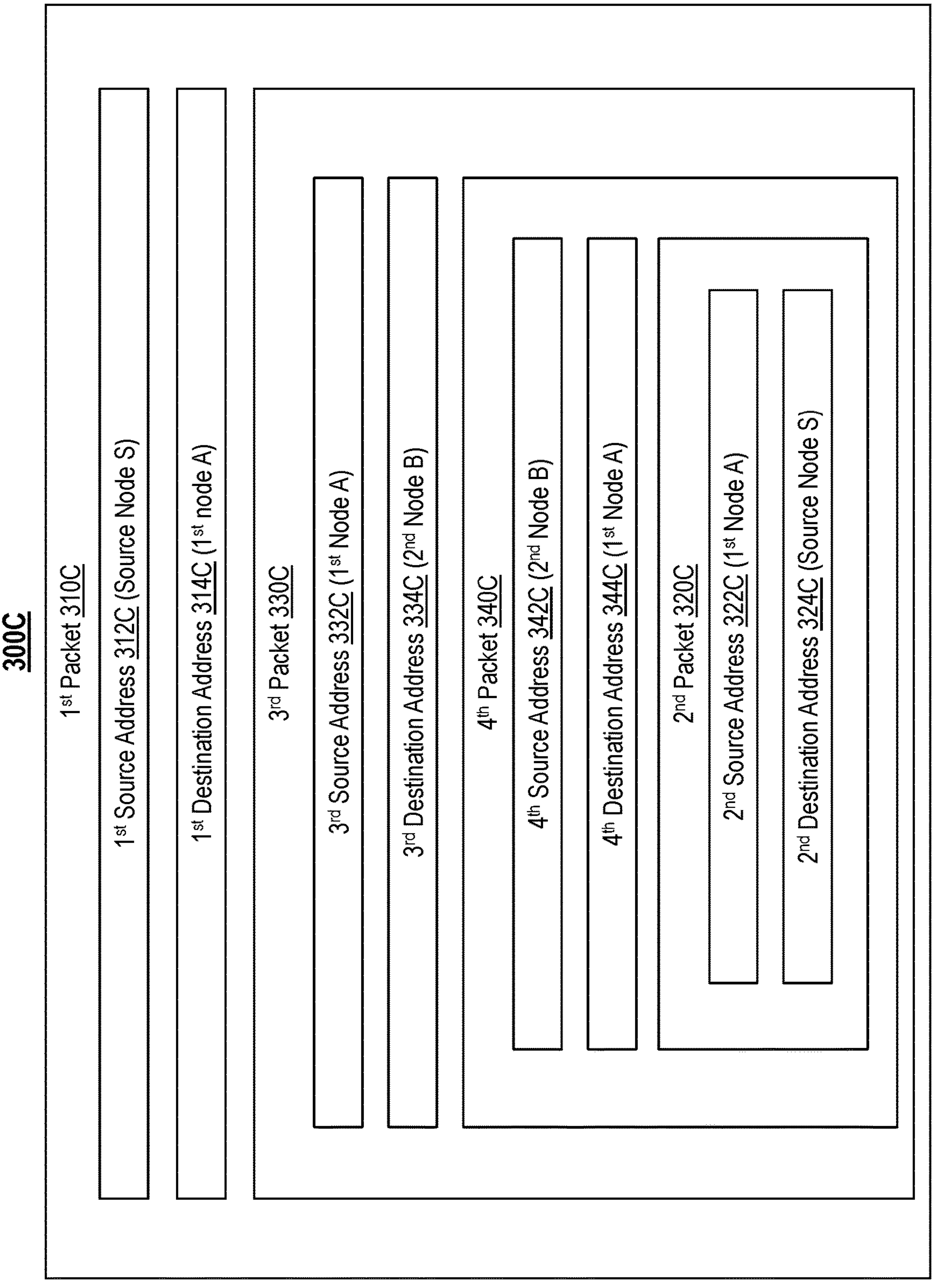
FIG. 3C illustrates an example of an encapsulated data packet configured to traverse a round trip of a second sub-path in a path.

FIG. 3C illustrates an example of an encapsulated data packet 300C which is configured to traverse the second sub-path between the source node and the second node B. For generating the data packet 300C, a first packet 310C, a second packet 320C, a third packet 330C, and a fourth packet 340C are generated. The first packet 310C includes a first source address 312C and a second source address 314C. The first source address 312C stores the network address of the source node S. The first destination address 314C stores the network address of the destination address of the first node A. The second packet 320C includes a second source address 322C and a second destination address 324C. The second source address 322C stores the network address of the first node A. The second destination address 324C stores the network address of the source node S. The third packet 330C includes a third source address 332C and a third destination address 334C. The third source address 332C stores the network address of the first node A. The third destination address 334C stores the network address of the second node B. The fourth packet 340C includes a fourth source address 342C and a fourth destination address field 344C. The fourth source address 342C stores the address of the second node B. The fourth destination address field 344C stores the address of the first node A.

Further, the fourth packet 340C is configured to encapsulate the second packet 320C; the third packet 330C is configured to encapsulate the fourth packet 340C, and the first packet 310C is configured to encapsulate the third packet 330C. As such, the data packet 300C includes the first packet 310C, which encapsulates the third packet 330C, which encapsulates the $4^{th}$ packet 340C, which encapsulates the second packet 320C. When the data packet 300C is sent by the source node S over the network 200, the data packet 300C is directed to the first node A, because the first destination address 314C stores the address of the first node A. Receiving the packet 300C, the first node A decapsulates the data packet 300C to extract the third packet 330C and send the third packet 330C over the network 200. When the third data packet 330C is sent over the network, the third data packet 300C is directed to the second node B, because the third destination address 334C stores the network address of the second node B. Receiving the third packet 330C, the second node B decapsulates the third packet 330C to extract the fourth packet 340C and send the fourth packet 340C over the network 200. When the fourth packet 340C is sent over the network, the fourth data packet 340C is directed to the first node A, because the fourth destination address field 344C stores the network address of first node A. Receiving the fourth data packet 340C, the first node A decapsulates the fourth data packet 340C to extract the second data packet 320C and send the second data packet 320C over the network. When the second data packet 320C is sent over the network, the second data packet 320C is directed to the source node S, because the second destination address 324C stores the address of the source node S. As such, a round trip of the first sub-path between the source node S and node B is traversed.

Again, it may be that not every data packet sent over the network 200 will be delivered at the destination address, especially when failures have occurred at one or more nodes along the path. In some embodiments, when the second packet 320C is not received within the predetermined time, it is determined that the second packet 320C is not received. As such, a third number of encapsulated data packets (each of which corresponds to the encapsulated data packet 300C) are generated and sent by the source node S over the network. A fourth number of the second packets (each of which corresponds to the second packet 320C) is received by the source node S within the predetermined time. A probability P(AB) that a data packet will successfully go through both node A and node B is computed by dividing the fourth number by the third number.

Alternatively, or in addition, in some embodiments, each of the second source address 322C, the third source address 332C, the fourth source address 342C includes the address of the source node S, and each of the first packet 310C, 320C, 330C, 340C includes a predetermined TTL value. When the TTL value is reached and the corresponding packet has not been delivered, the corresponding packet is discarded, and a TTL expiration message is sent to the source node S. Upon receiving a TTL expiration message, the source node S determines that the second packet 320C will not be received.

Figure 4A:
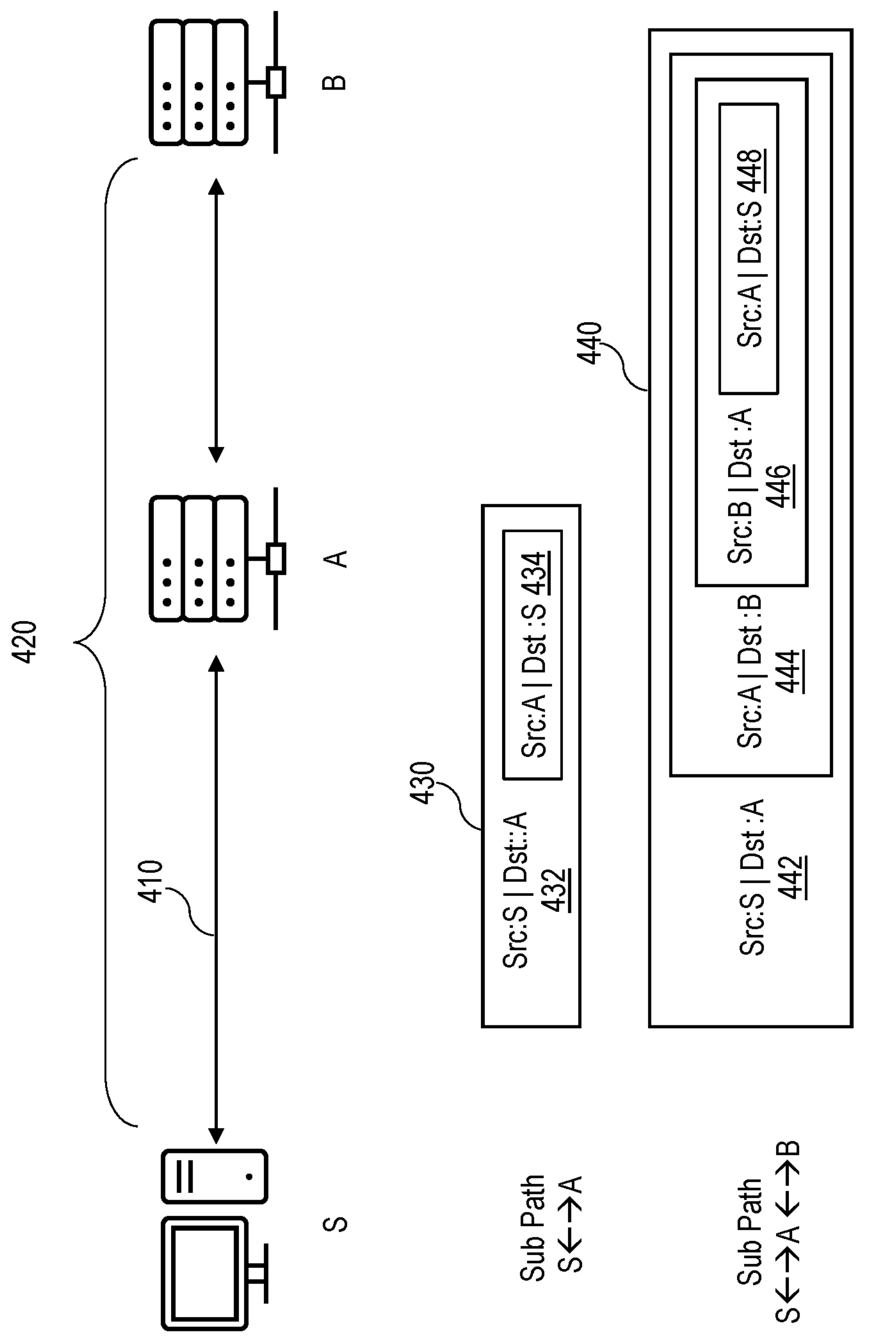
FIG. 4A illustrates an example of a first sub-path and a second sub-path and their corresponding sub-path data packets.

FIG. 4A illustrates an example of a first sub-path 410 between node S and a second sub-path 420 between node A and node B. The nodes S, A, and B corresponds to the nodes S, A, and B of FIG. 2. A first sub-path data packet 430. The first sub-path data packet 430 corresponds to the data packet 300B of FIG. 3B. The first sub-path data packet 430 includes a first data packet 432 that encapsulates a second data packet 434. The first data packet 432 includes the network address of the source node S as its source address, and the network address of the node A as the destination address. The second data packet 434 includes the network address of the node A as its source address, and the network address of the source node S as its destination address.

Figures 4B, 4C:
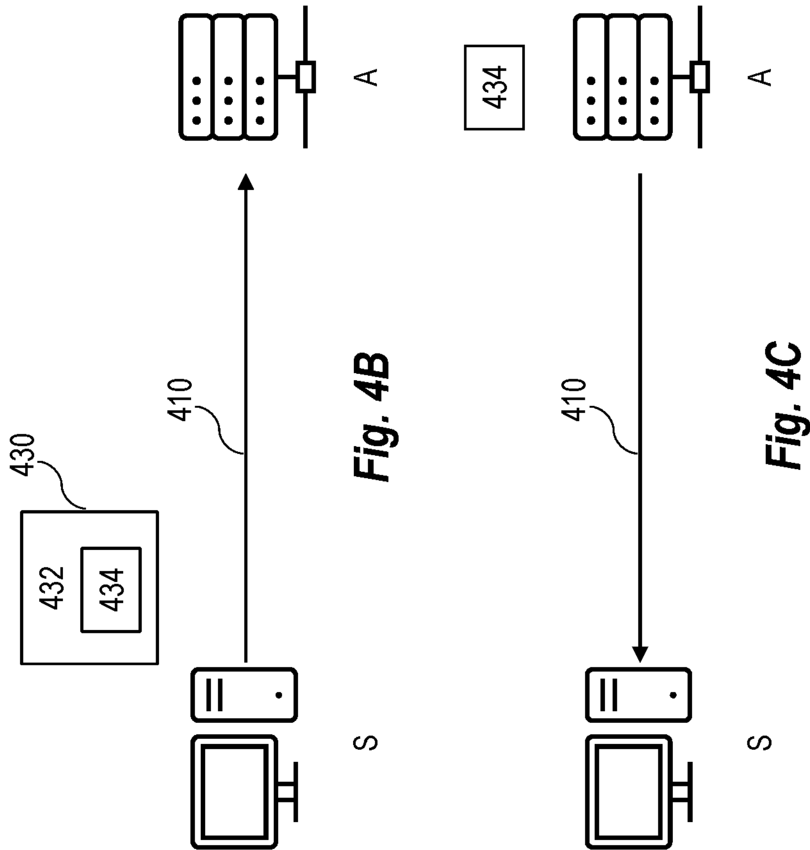
FIGS. 4B-4C illustrate a process of using a first sub-path data packet to traverse a first sub-path.

Referring to FIGS. 4B-4C, when the first sub-path data packet 430 is sent by the source node S, the first sub-path data packet 430 is received by the node A. Receiving the first sub-path data packet 430, the node A decapsulates the data packet 430 to extract the second data packet 434 and send the second data packet 434 over the network, causing the second data packet to be received by the source node S.

As discussed above with respect to FIG. 3B, a plurality of such first sub-path packets 430 are generated and sent by the source node S. Due to the condition of the network, in some cases, not every second data packets 434 can be received by the source node S. Depending on the relative ratio between the number of received second data packets 434 and the number of total data packets 430 sent, a probability P(A) can be computed.

Next, a second sub-path packet 440 is generated for traversing a round trip of the second sub-path between the source node S and node B. The second sub-path packet 440 corresponds to the data packet 300C of FIG. 3C. The second sub-path packet 440 includes a first packet 442, a second packet 448, a third packet 444, and a fourth packet 446. The first packet 442 includes the network address of node S as its source address and the network address of node A as its destination address. The second packet 448 includes the network address of node A as its source address and the network address of the source node S as its destination address. The third packet 444 includes the network address of node A as its source address and the network address of node B as its destination address. The forth packet 446 includes the network address node B as its source address and the network address of node A as its destination address. The first packet 442 encapsulates the third packet 444, which encapsulates the fourth packet 446, which encapsulates the second packet 448.

Figures 4D, 4E:
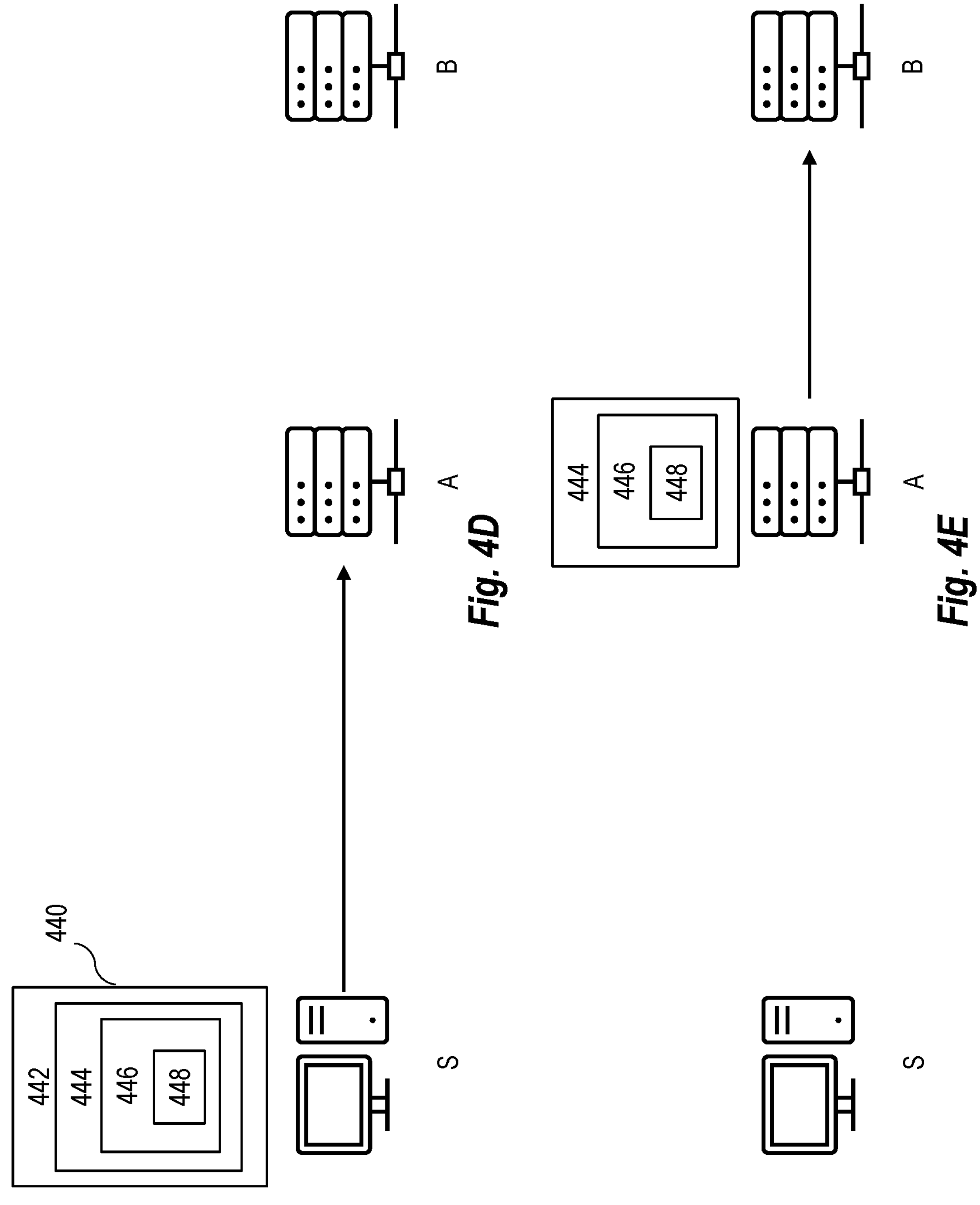
FIGS. 4D-4G illustrate a process of using a second sub-path data packet to traverse a second sub-path.
Figures 4F, 4G:
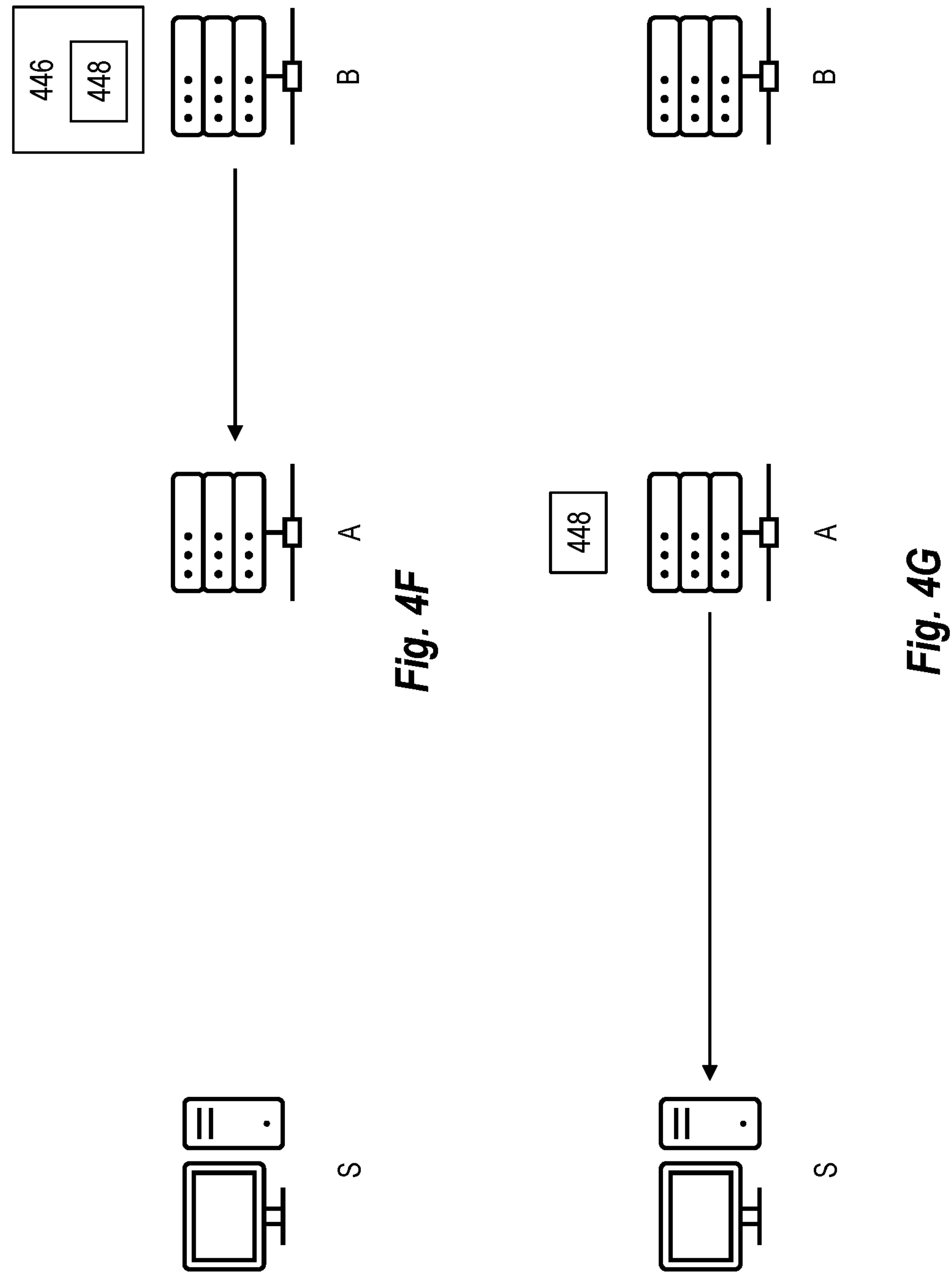

Referring to FIGS. 4D-4E, when the data packet 440 is sent by the source node S, the data packet 440 is received by node A. Receiving the packet 440, node A decapsulates the data packet 440 to extract the third data packet 444 and send the third data packet 444 over the network, causing the third data packet 444 to be received by node B. Referring to FIGS. 4F-4G, receiving the third data packet 444, node B is configured to decapsulates the third data packet 444 to extract the fourth data packet 446 and send the fourth data packet 446 over the network, causing the fourth data packet 446 to be received by node A. Upon receiving the fourth data packet 446, node A decapsulates the fourth data packet 446 to extract the second data packet 448 and send the second data packet 448 over the network, causing the second data packet 448 to be received by the source node S.

As discussed above with respect to FIG. 3C, a plurality of such second sub-path packets 440 are generated and sent by the source node S. Due to the condition of the network, in some cases, not every second data packets 448 can be received by the source node S. Depending on the relative ratio between the number of received second data packets 434 and the number of total data packets 430 sent, a probability P(AB) can be computed.

Now, the source node S has obtained a first probability P(A) that a packet can go through node A successfully and a second probability P(AB) that a packet can go through both node A and node B successfully. P(B|A) is denoted as a conditional probability that a packet can go through B given that the packet can go through node A. The conditional probability P(B|A) can be computed based on the following equation (1):

$$P(B|A)=P(AB)/P(A) \quad \text{Equation (1)}$$

The above-described process repeats again for obtaining (1) a probability P(ABC) (that a data packet can go through nodes ABC), (2) a probability P(ABCD) (that a data packet can go through nodes ABCD), (3) a probability P (ABCDE) (that a data packet can go through nodes ABCDE), (4) a probability P(ABCDEF) (that a data packet can go through nodes ABCDEF), and (5) a probability P(ABCDEFG) (that a data packet can go through nodes ABCDEF). Conditional probabilities P(C|AB), P(D|ABC), P(E|ABCD), P(F|ABCDE), and P(G|ABCDEF), each of which corresponds to a probability that a data packet can go through each of nodes A-G respectively. The following equations (2)-(6) can be used to compute the conditional probabilities P(C|AB), P(D|ABC), P(E|ABCD), P(F|ABCDE), and P(G|ABCDEF):

$$P(C|AB)=P(ABC)/P(AB) \quad \text{Equation (2)}$$

$$P(D|ABC)=P(ABCD)/P(ABC) \quad \text{Equation (3)}$$

-continued $$P(E|ABCD)=P(ABCDE)/P(ABCD) \quad \text{Equation (4)}$$

$$P(F|ABCDE)=P(ABCDEF)/P(ABCDE) \quad \text{Equation (5)}$$

$$P(G|ABCDEF)=P(ABCDEFG)/P(ABCDEF) \quad \text{Equation (6)}$$

FIG. 5 illustrates a set of tables 510 and 520, including an example set of data generated based on the process described above. Table 510 includes data associated with a plurality of sub-paths, including a first sub-path A 511 (which corresponds to the sub-path between the source node S and the node A of FIG. 2), a second sub-path AB 512 (which corresponds to the sub-path between the source node S and the node B of FIG. 2), a third sub-path ABC 513 (which corresponds to the sub-path between the source node S and the node C of FIG. 2), a fourth sub-path ABCD 514 (which corresponds to the sub-path between the source node S and node D of FIG. 2), a fifth sub-path ABCDE 515 (which corresponds to the sub-path between the source node S and node E of FIG. 2), a sixth sub-path ABCDEF 516 (which corresponds to the sub-path between the source node S and node F of FIG. 2), and sub-path ABCDEFG (which corresponds to the sub-path between the source node S and node G of FIG. 2).

As illustrated, a total number of packets sent from the source node along the first sub-path A 511 is 160, and a total number of packets successfully returned to the source node S is also 160. As such the probability P(A) of success rate for a packet going through node A is 1 (i.e., 100%). A total number of packets sent from the source node along the second sub-path AB 512 is 161, and a total number of packets successfully returned to the source node S is also 161. As such, the probability P(AB) of success rate for a packet going through both nodes A and B is 1 (i.e., 100%). Similarly, a total number of packets sent along the third sub-path ABC 513 or the fourth sub-path ABCD 514 is 160, and a total number of packets successfully returned to the source node S is also 160. As such, the probability P(ABC) or P(ABCD) of success rate for a packet going through the nodes ABC or nodes ABCD is also 1 (i.e., 100%).

Further, a total number of packets sent along the fifth sub-path ABCDE 515 is 100, and a total number of packets received at the source node S is 68. As such, the probability P(ABCDE) of success rate for a packet going through nodes ABCDE 515 is 0.68. Intuitively, one could tell that some failures have occurred at node E. Similarly, a total number of packets sent along the sixth path ABCDEF 516 is 50, and a total number of packets received at the source node S is 34. As such, the probability P(ABCDEF) success rate for a packet going through node ABCDEF 516 is 0.68. Finally, a total number of packets sent along the seventh path ABCDEFG 517 is 49, and a total number of packets received at the source node S is 33. As such, the probability P(ABCDEFG) of success rate for a packet going through node ABCDEFG 517 is 0.673469.

Table 520 illustrates a list of conditional probabilities computed based on the equations (1)-(6) above. As shown in table 520, conditional probabilities P(A), P(B|A) P(C|AB), P(D|ABC), P(F|ABCDE) all equal to 1 (i.e., 100%). The conditional probability P(E|ABCD) is 0.68, and the conditional probability P(G|ABCDEF) is 0.9903696. Based on the data detected in table 510 and computed in table 520, it is clear that some failures had occurred at node E because only 68% of packets can go through node E.

As illustrated, the above-described process merely localizes network failures in one particular path SABCDEFG of the network 200. There are many different paths in the network 200. In some embodiments, for each of these paths, the above-described process repeats, and network failures in the corresponding path are localized. For example, in some embodiments, the same process is performed on multiple distinct paths from S to P, such as path SAHIJKP and path SALMNOP. As such, the failures of the whole network 200 will eventually be localized.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6A:
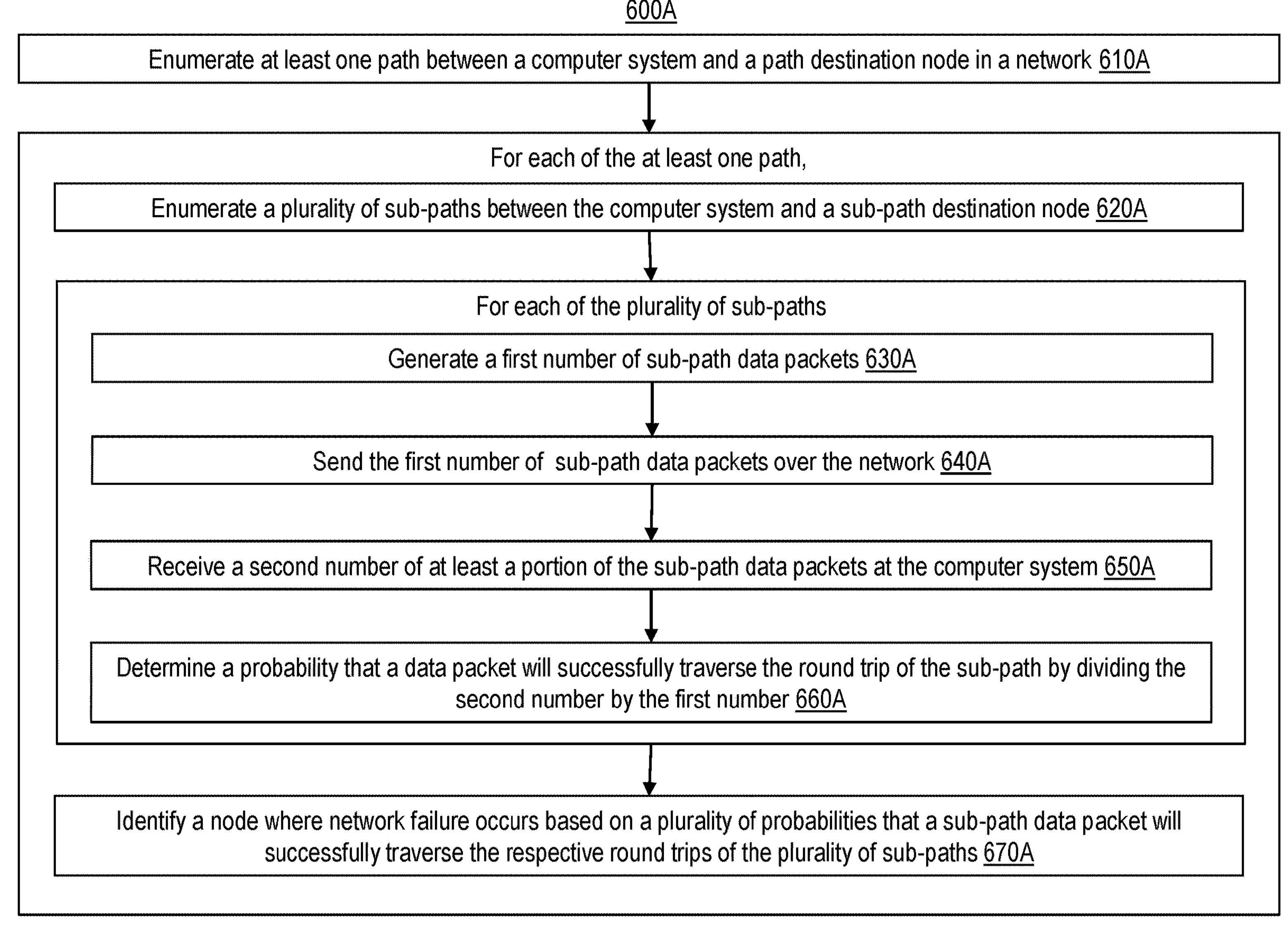
FIG. 6A illustrates a flowchart of an example method for localizing network failure in a network with a known topology.

FIG. 6A illustrates a flowchart of an example method 600A for localizing network failure in a network with a known topology. The topology of the network indicates a plurality of nodes in the network and how the plurality of nodes are connected to each other. In some embodiments, the method 600A is implemented at a computer system in the network. The method 600A includes enumerating at least one path between the computer system and a path destination node in the network through one or more intermediary nodes in the network (act 610A). For each of the at least one path, a plurality of sub-paths between the computer system and the path destination node are enumerated (act 620A). Each sub-path has either the path destination node, or one or more intermediary nodes of the corresponding path as a corresponding sub-path destination node. For each of the plurality of sub-paths, a first number of sub-path data packets are generated (act 630A). Each of the first number of sub-path data packets is configured to traverse a round trip of the corresponding sub-path from the computer system to the corresponding sub-path destination node, and then from the corresponding sub-path destination node back to the computer system. The first number of sub-path data packets are then sent over the network (act 640A). Thereafter, a second number of at least a portion of the sub-path data packets are received by the computer system (act 650A). A probability that a data packet can successfully traverse the round trip of the corresponding sub-path is determined by dividing the second number by the first number (act 660A). As such, a plurality of probabilities are determined. Each of the plurality of probabilities corresponds to a probability that a packet can successfully traverse one of the plurality of sub-paths. Based on the plurality of probabilities, the computer system identifies an intermediary node or the path destination node where network failures have occurred (act 670A). In some embodiments, the act 670A includes identifying an intermediary node or the path destination node where network failures have occurred based on the plurality of probabilities that a data packet can successfully traverse the respective round trips of the plurality of sub-paths. In some embodiments, the method 600A also includes displaying at the computer system a list of probabilities corresponding to a list of sub-paths and/or displaying one or more nodes at which network failures have occurred.

Figure 6B:
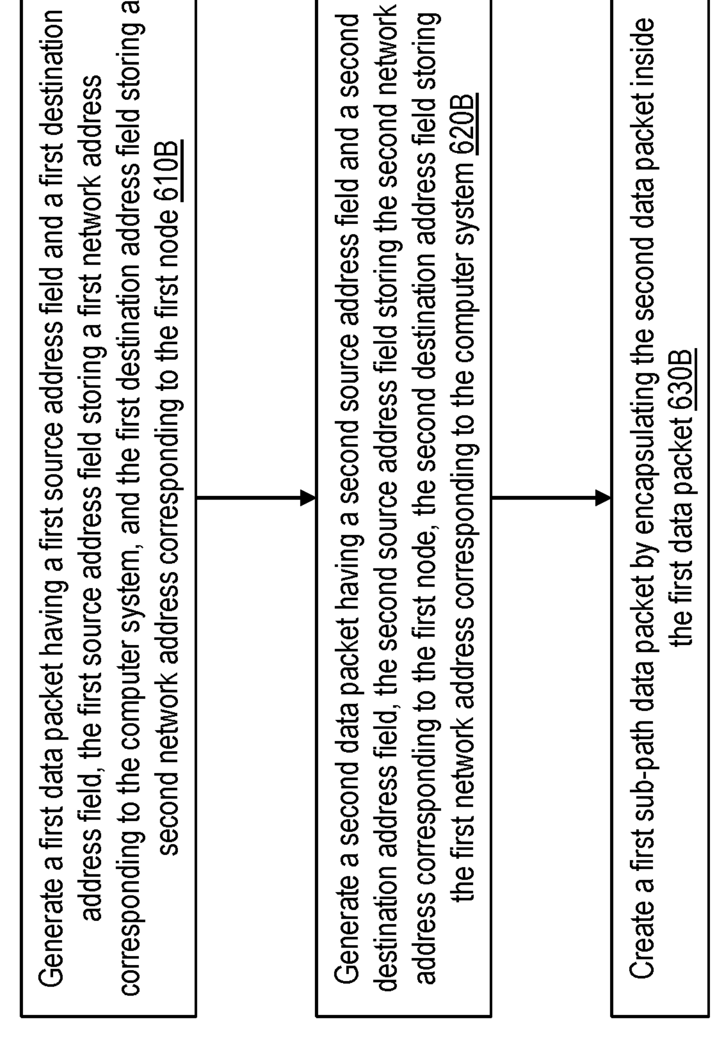
FIG. 6B illustrates a flowchart of an example method for generating a first sub-path data packet for a first sub-path between a computer system and a first node directly connected to the computer system.

FIG. 6B illustrates a flowchart of an example method 600B for generating a first sub-path data packet for a first sub-path between a computer system and a first node directly connected to the computer system, which corresponds to the act 630A of FIG. 6A. The method 600B includes generating a first data packet having a first source address field and a first destination address field (act 610B). The first source address field stores a first network address corresponding to the computer system, and the first destination address field stores a second network address corresponding to the first node. The method 600B also includes generating a second data packet having a second source address field and a second destination address field. The second address field stores the second address corresponding to the first node, and the second destination address field stores the first network address corresponding to the computer system (act 620B). The method 600B further includes creating the first sub-path data packet by encapsulating the second data packet inside the first data packet 630B, such that when the first sub-path data packet is sent over the network, the first sub-path data packet is configured to be received by the first node. Receiving the first sub-path packet, the first node decapsulates the first sub-path data packet to extract the second data packet and send the second data packet over the network. When the second data packet is sent over the network, the second data packet is configured to be received by the computer system.

Figure 6C:
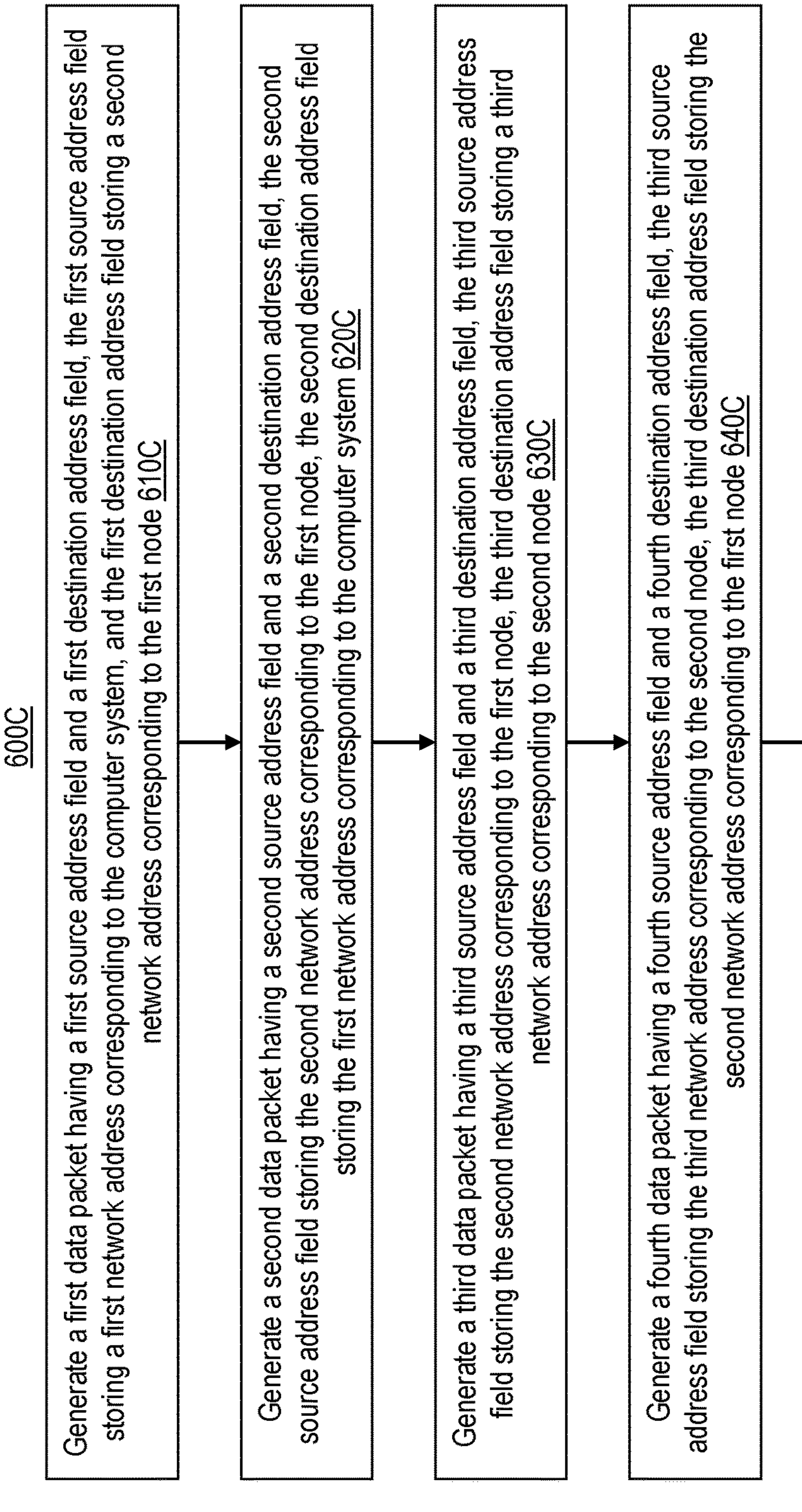
FIG. 6C illustrates a flowchart of an example method for generating a second sub-path data packet for a second sub-path between a computer system and a second node that is directly connected to a first node that is directly connected to the computer system.

FIG. 6C illustrates a flowchart of an example method 600C for generating a second sub-path data packet for a second sub-path between a computer system and a second node that is directly connected to a first node that is directly connected to the computer system, which corresponds to the act 630A of FIG. 6A. FIG. 6C includes generating a first data packet having a first source address field and a first destination address field (act 610C). The first source address field stores a first network address corresponding to the computer system, the first destination address stores a second network address corresponding to the first node. The method 600C further includes generating a second data packet having a second source address field and a second destination address field (act 620C). The second source address field stores the second network address corresponding to the first node, and the second destination address field stores the first network address corresponding to the computer system.

The method 600C further includes generating a third data packet having a third source address and a third destination address field (act 630C). The third source address stores the second network address corresponding to the first node, and the third destination address stores a third network address corresponding to the second node. The method 600C further includes generating a fourth data packet having a fourth source address field and a fourth destination address field (act 640C). The fourth source address field stores the third network address corresponding to the second node, and the fourth destination address field stores the second network address corresponding to the first node.

The method 600C also includes encapsulating the second data packet inside the fourth data packet to generate a first encapsulated packet (act 650C). The method 600C also includes encapsulating the first encapsulated packet inside the third data packet to generate a second encapsulated packet (act 660C). The method 600C also includes encapsulating the second encapsulated packet inside the first data packet to generate the second sub-path data packet (act 670C).

Figure 6D:
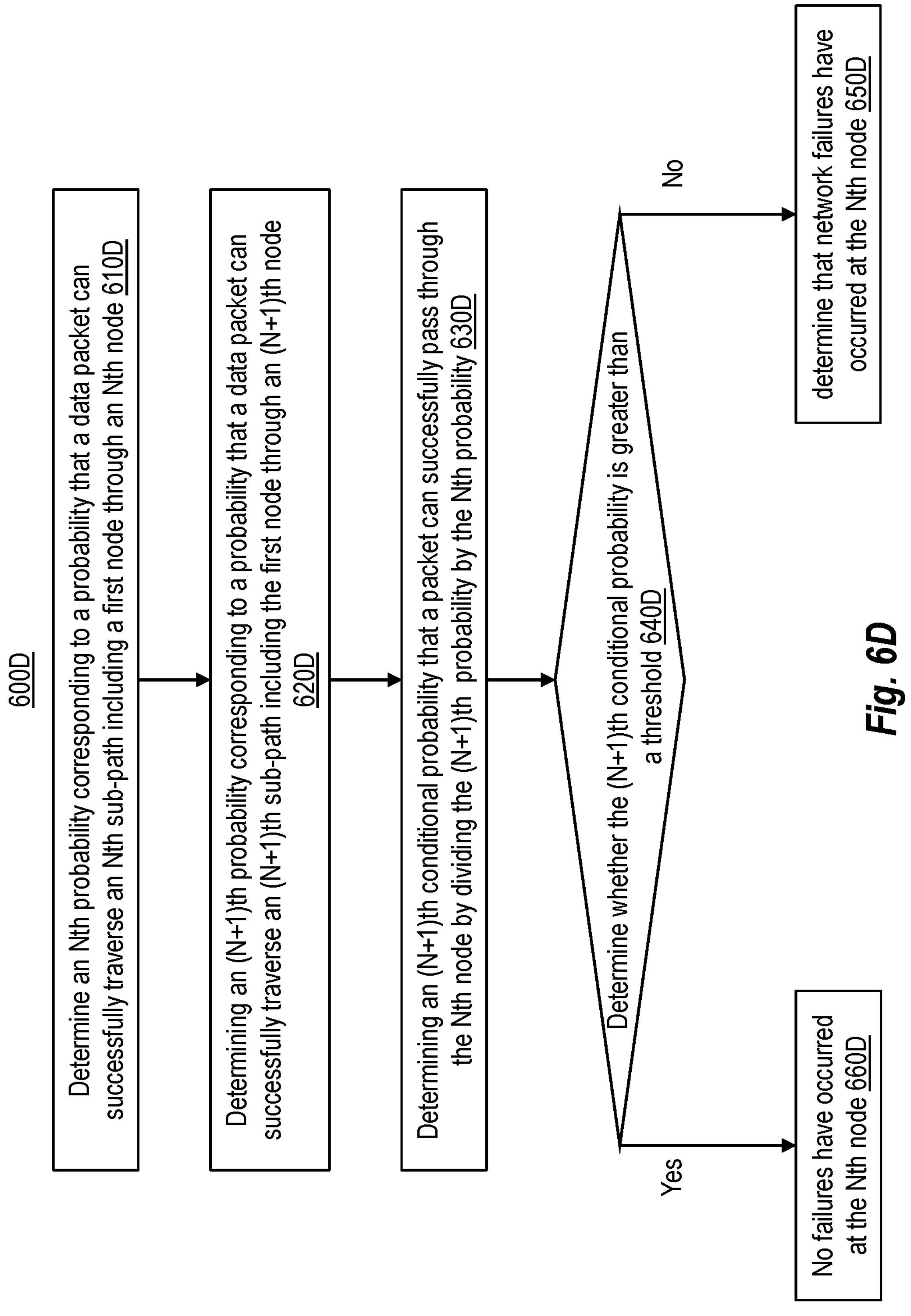
FIG. 6D illustrates a flowchart of an example method for identifying an intermediary node or the path destination node where network failures have occurred.

FIG. 6D illustrates a flowchart of an example method 600D for identifying an intermediary node or the path destination node where network failures have occurred, which corresponds to the act 670A of FIG. 6A. The method 600D includes determining an Nth probability corresponding to a probability that a data packet can successfully traverse an Nth sub-path, including a first node through an Nth node of a path among the at least one path (act 610D) and determining an (N+1)th probability corresponding to a probability that a data packet can successfully traverse an (N+1)th sub-path including the first node through an (N+1)

th node of the path (act 620D), where N is a natural number. The method 600D includes determining an (N+1)th conditional probability that a packet can successfully pass through the Nth node by dividing the (N+1)th probability by the Nth probability (act 630D). In some embodiments, the method 600D further includes determining whether the conditional probability is greater than a threshold (act 640D). In response to determining that the conditional probability that a packet can successfully pass through the Nth node is no greater than a threshold, it is determined that network failures have occurred at the Nth node (act 650D). Otherwise, it is determined that no significant failures (or no significant failures) have occurred at the Nth node (act 660D).

For the processes and methods disclosed herein, the operations performed in the processes and methods may be implemented in differing orders. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system in a network that includes one or more processors, for localizing network failure in the network with a topology, the topology of the network indicating a plurality of nodes in the network and how the plurality of nodes are connected to each other, the method comprising:

enumerating, by the one or more processors, at least one path between the computer system and a path destination node in the network through one or more intermediary nodes in the network;

enumerating, by the one or more processors, a plurality of sub-paths between the computer system and the path destination node, each sub-path having one or more intermediary nodes of the at least one path as a corresponding sub-path destination node;

for each of the plurality of sub-paths, generating a first number of sub-path data packets, each of the first number of sub-path data packets configured to traverse a round trip of the corresponding sub-path from the computer system to the corresponding sub-path destination node, and then from the corresponding sub-path destination node back to the computer system;

sending, by the computer system, the first number of sub-path data packets over the network; and receiving, by the computer system, a second number of at least a portion of the sub-path data packets;

determining a probability that a data packet can successfully traverse the round trip of the corresponding sub-path by dividing the second number by the first number; and identifying an intermediary node where network failures have occurred, based on a plurality of probabilities that a data packet can successfully traverse the respective round trips of the plurality of sub-paths.

2. The method of claim 1, wherein:

receiving the second number of at least a portion of the sub-path data packets is receiving the second number of at least a portion of the sub-path data packets within a predetermined time; and a portion of the sub-path data packet that is received after the predetermined time is not counted as one of the second number.

3. The method of claim 1, further comprising:

determining an Nth probability corresponding to a probability that a data packet can successfully traverse an Nth sub-path of the at least one path, the Nth sub-path including a first node through an Nth node along the at least one path, where N is a natural number;

determining an (N+1)th probability corresponding to a probability that a data packet can successfully traverse an (N+1)th sub-path of the at least one path, the (N+1)th sub-path including the first node through an (N+1)th node along the at least one path;

determining an (N+1)th conditional probability that a data packet can pass through the (N+1)th node after the data packet can pass through the Nth node by dividing the (N+1)th probability by the Nth probability;

determining whether the (N+1)th conditional probability is greater than a threshold; and in response to determining that the (N+1)th conditional probability is no greater than the threshold, determining that failures have occurred at the (N+1)th node.

4. The method of claim 1, wherein:

the plurality of sub-paths includes a first sub-path between the computer system and a first node directly connected to the computer system; and the method comprises:

generating a first number of first sub-path data packets;

sending, by the computer system, the first number of first sub-path data packets over the network, causing at least a portion of the first sub-path data packets to traverse a round trip from the computer system to the first node and then from the first node back to the computer system;

receiving, by the computer system, a second number of at least a portion of the first sub-path data packets;

determining, by the one or more processors, a first probability that a data packet can successfully traverse the first sub-path by dividing the second number by the first number; and when the first probability is no greater than a threshold, determining that network failures have occurred at the first node.

5. The method of claim 1, wherein:

each first sub-path data packet comprises a second data packet encapsulated inside a first data packet, the first data packet having a first destination address field, the first destination address field storing a second network address corresponding to the first node, and the second data packet having a second destination address field, the second destination address field storing a first network address corresponding to the computer system; and sending the first sub-path data packet over the network causes the first node to decapsulate the data packet to extract the second data packet and send the second data packet over the network, causing the computer system to receive the second data packet.

6. The method of claim 5, wherein:

the first data packet further includes a first source address field and a first time-to-live (TTL) field, the first source address field storing the first network address corresponding to the computer system and the first TTL field storing a first TTL value;

the second data packet has a second source address and a second TTL field, the second source address storing the first network address corresponding to the computer system, and the second TTL field storing a second TTL value;

when the first TTL value or the second TTL value is reached, and the respective first data packet or second data packet has not been delivered at the respective destination address, a TTL expiration message is sent to the computer system; and in response to receiving the TTL expiration message, the computer system determines that the first sub-path data packet did not successfully traverse the first sub-path.

7. The method of claim 1, wherein:

the plurality of sub-paths includes a second sub-path between the computer system and a second node that is directly connected to a first node; and the method comprises:

generating a third number of second sub-path data packets for the second sub-path;

sending, by the computer system, the third number of second sub-path data packet over the network;

receiving, by the computer system, a fourth number of at least a portion of the second data packets;

determining, by the one or more processors, a second probability that a data packet will successfully traverse the second sub-path by dividing the fourth number by the third number;

determining, by the one or more processors, a third probability that a data packet will successfully pass the second node by dividing the second probability by the first probability; and when the third probability is no greater than a threshold, determining that network failure occurs at the second node.

8. The method of claim 7, wherein:

each second sub-path data packet comprises a second data packet encapsulated inside a fourth data packet, the fourth data packet encapsulated inside a third data packet, and the third data packet encapsulated inside a first data packet, the first data packet having a first destination address field, the first destination address field storing a second network address corresponding to the first node, the second data packet having a second destination address field, the second destination address field storing a first network address corresponding to the computer system, the third data packet having a third destination address field, the third destination address field storing a third network address corresponding to the second node, and the fourth data packet having a fourth destination address field, the fourth destination address field storing the second network address corresponding to the first node; and sending the second sub-path data packet over the network causes the first node to decapsulate the second sub-path data packet to extract the second encapsulated data packet and send the second encapsulated data packet over the network, which causes the second encapsulated data packet to be sent over the network and received by the second node, which causes the second node to decapsulate the second encapsulated data packet to extract the first encapsulated data packet and send the first encapsulated data packet over the network, which causes the first encapsulated data packet to be received by the first node and decapsulated to extract the second data packet, which causes the second data packet to be sent over the network, which causes the computer system to receive the second data packet.

9. The method of claim 8, wherein:

the first data packet further includes a first source address field and a first time-to-live (TTL) field, the first source address field storing the first address corresponding to the computer system, and the first TTL field storing a first TTL value;

the second data packet has a second source address field and a second TTL field, the second source address field storing the first address corresponding to the computer system, and the TTL field storing a second TTL value;

the third data packet has a third source address field and a third TTL field, the third source address field storing the first address corresponding to the computer system, and the third TTL field storing a third TTL value;

the fourth data packet has a fourth source address field and a fourth TTL field, the fourth source address field storing the first address corresponding to the computer system, and the fourth TTL field storing a fourth TTL value;

when the first TTL value, the second TTL value, the third TTL value, or the fourth TTL value is reached, and the respective first data packet, second data packet, third data packet, or fourth data packet has not been delivered at the respective destination address, a TTL expiration message is sent to the computer system; and in response to receiving the TTL expiration message, the computer system determines that the second sub-path data packet did not successfully traverse the second sub-path.

10. The method of claim 8, wherein each of the first network address, the second network address, or the third network address is an Internet protocol (IP) address.

11. The method of claim 1, wherein each sub-path data packet is sent over the network via IP-in-IP protocol.

12. The method of claim 1, further comprising:

displaying at the computer system a list of probabilities corresponding to a list of sub-paths; and displaying one or more nodes at which network failures have occurred.

13. The method of claim 12, wherein, each node corresponds to an IP address, and displaying a list of sub-paths comprises displaying a list of IP addresses corresponding to nodes along the list of sub-paths.

14. A computer system in a network, comprising:

one or more processors; and one or more non-transitory computer-readable hardware storage devices having stored thereon computer-executable instructions that are structured such that, when executed by the one or more processors, the computer-executable instructions configure the computing system to perform at least:

enumerate at least one path between the computer system and a path destination node in the network through one or more intermediary nodes in the network;

enumerate a plurality of sub-paths between the computer system and the path destination node, each sub-path having one or more of intermediary nodes of the at least one path as a corresponding sub-path destination node;

for each of the plurality of sub-paths, generate a first number of sub-path data packets, each of the first number of sub-path data packets configured to traverse a round trip of the corresponding sub-path from the computer system to the corresponding sub-path destination node, and then from the corresponding sub-path destination node back to the computer system;

send the first number of sub-path data packets over the network; and receive a second number of at least a portion of the sub-path data packets;

determine a probability that a data packet can successfully traverse the round trip of the corresponding sub-path by dividing the second number by the first number; and identify an intermediary node where network failures have occurred, based on a plurality of probabilities that a data packet can successfully traverse the respective round trips of the plurality of sub-paths.

15. The computer system of claim 14, wherein:

receiving the second number of at least a portion of the sub-path data packets is receiving the second number of at least a portion of the sub-path data packets within a predetermined time; and a portion of the sub-path data packet that is received after the predetermined time is not counted as one of the second number.

16. The computer system of claim 14, wherein the computer-executable instructions are also structured such that, when executed by the one or more processors, the computer-executable instructions configure the computing system to perform at least:

determine an Nth probability corresponding to a probability that a data packet can successfully traverse an Nth sub-path of the at least one path, the Nth sub-path including a first node through an Nth node along the at least one path, where N is a natural number;

determine an (N+1)th probability corresponding to a probability that a data packet can successfully traverse an (N+1)th sub-path of the at least one path, the (N+1)th sub-path including the first node through an (N+1)th node along the at least one path;

determine an (N+1)th conditional probability that a data packet can pass through the (N+1)th node after the data packet can pass through the Nth node by dividing the (N+1)th probability by the Nth probability;

determine whether the (N+1)th conditional probability is greater than a threshold; and in response to determining that the (N+1)th conditional probability is no greater than the threshold, determine that failures have occurred at the (N+1)th node.

17. The computer system of claim 14, wherein:

the plurality of sub-paths includes a first sub-path between the computer system and a first node directly connected to the computer system; and the computer-executable instructions are also structured such that, when executed by the one or more processors, the computer-executable instructions configure the computing system to perform at least:

generate a first number of first sub-path data packets;

send, by the computer system, the first number of first sub-path data packets over the network, causing at least a portion of the first sub-path data packets to traverse a round trip from the computer system to the first node and then from the first node back to the computer system;

receive, by the computer system, a second number of at least a portion of the first sub-path data packets;

determine, by the one or more processors, a first probability that a data packet can successfully traverse the first sub-path by dividing the second number by the first number; and when the first probability is no greater than a threshold, determine that network failures have occurred at the first node.

18. The computer system of claim 14, wherein:

each first sub-path data packet comprises a second data packet encapsulated inside a first data packet, the first data packet having a first destination address field, the first destination address field storing a second network address corresponding to the first node, and the second data packet having a second destination address field, the second destination address field storing a first network address corresponding to the computer system; and sending the first sub-path data packet over the network causes the first node to decapsulate the data packet to extract the second data packet and send the second data packet over the network, causing the computer system to receive the second data packet.

19. The computer system of claim 14, wherein:

the plurality of sub-paths includes a second sub-path between the computer system and a second node that is directly connected to a first node; and the computer-executable instructions are also structured such that, when executed by the one or more processors, the computer-executable instructions configure the computing system to perform at least:

generate a third number of second sub-path data packets for the second sub-path;

send, by the computer system, the third number of second sub-path data packet over the network;

receive, by the computer system, a fourth number of at least a portion of the second data packets;

determine, by the one or more processors, a second probability that a data packet will successfully traverse the second sub-path by dividing the fourth number by the third number;

determine, by the one or more processors, a third probability that a data packet will successfully pass the second node by dividing the second probability by the first probability; and when the third probability is no greater than a threshold, determine that network failure occurs at the second node.

20. A non-transitory computer-readable hardware storage device having stored thereon computer-executable instructions that are structured such that, when executed by one or more processors, the computer-executable instructions configure a computing system to perform at least:

enumerate at least one path between the computer system and a path destination node in a network through one or more intermediary nodes in the network;

enumerate a plurality of sub-paths between the computer system and the path destination node, each sub-path having one or more of intermediary nodes of the at least one path as a corresponding sub-path destination node;

for each of the plurality of sub-paths, generate a first number of sub-path data packets, each of the first number of sub-path data packets configured to traverse a round trip of the corresponding sub-path from the computer system to the corresponding sub-path destination node, and then from the corresponding sub-path destination node back to the computer system;

send the first number of sub-path data packets over the network; and receive a second number of at least a portion of the sub-path data packets;

determine a probability that a data packet can successfully traverse the round trip of the corresponding sub-path by dividing the second number by the first number; and identify an intermediary node where network failures have occurred, based on a plurality of probabilities that a data packet can successfully traverse the respective round trips of the plurality of sub-paths.

* * * * *